United States Patent
MacPherson

(10) Patent No.: US 7,603,673 B2
(45) Date of Patent: Oct. 13, 2009

(54) METHOD AND SYSTEM FOR REDUCING CONTEXT SWITCH TIMES

(75) Inventor: Mike MacPherson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1248 days.

(21) Appl. No.: 10/975,571

(22) Filed: Oct. 28, 2004

(65) Prior Publication Data

US 2006/0100986 A1    May 11, 2006

(51) Int. Cl.
G06F 9/46 (2006.01)
G06F 9/44 (2006.01)
G06F 13/24 (2006.01)
G06F 3/00 (2006.01)

(52) U.S. Cl. ............... 718/108; 718/102; 718/103; 712/220; 712/228; 710/48; 710/58; 710/59; 710/260

(58) Field of Classification Search ......... 718/100–108; 712/220–228; 710/48, 58, 59, 260
See application file for complete search history.

(56) References Cited

U.S. PATENT DOCUMENTS

| | | | | |
|---|---|---|---|---|
| 4,517,641 A | * | 5/1985 | Pinheiro | 710/20 |
| 5,696,701 A | * | 12/1997 | Burgess et al. | 714/25 |
| 5,758,071 A | * | 5/1998 | Burgess et al. | 709/220 |
| 5,796,633 A | * | 8/1998 | Burgess et al. | 702/187 |
| 6,073,159 A | * | 6/2000 | Emer et al. | 718/103 |
| 6,085,215 A | * | 7/2000 | Ramakrishnan et al. | 718/102 |
| 6,275,749 B1 | * | 8/2001 | Saville et al. | 700/292 |
| 6,301,604 B1 | * | 10/2001 | Nojima | 718/108 |
| 6,324,492 B1 | * | 11/2001 | Rowe | 703/13 |
| 6,816,977 B2 | * | 11/2004 | Brakmo et al. | 713/323 |
| 7,134,002 B2 | * | 11/2006 | Shoemaker | 712/228 |
| 7,269,713 B2 | * | 9/2007 | Anderson et al. | 712/214 |
| 7,386,707 B2 | * | 6/2008 | Kurata et al. | 712/218 |
| 2004/0216113 A1 | * | 10/2004 | Armstrong et al. | 718/104 |
| 2005/0141554 A1 | * | 6/2005 | Hammarlund et al. | 370/468 |

OTHER PUBLICATIONS

Mueller, "A Library Implementation of POSIX Threads Under UNIX", USENIX, 1993, pp. 29-42.*

* cited by examiner

*Primary Examiner*—Meng-Ai An
*Assistant Examiner*—Jennifer N To
(74) *Attorney, Agent, or Firm*—Blakely, Sokoloff, Taylor & Zafman LLP

(57) ABSTRACT

An apparatus for managing resource in a multithreaded system, and attempting to increase the speed in which task switching occurs by controlling when thread state is stored to memory. The apparatus includes a thread dispatcher circuit capable of determining, based upon an estimated state retirement rate associated with the worker threads and a rate of saving state of the worker threads, if the worker threads should be halted and saved the state of the worker threads.

32 Claims, 3 Drawing Sheets

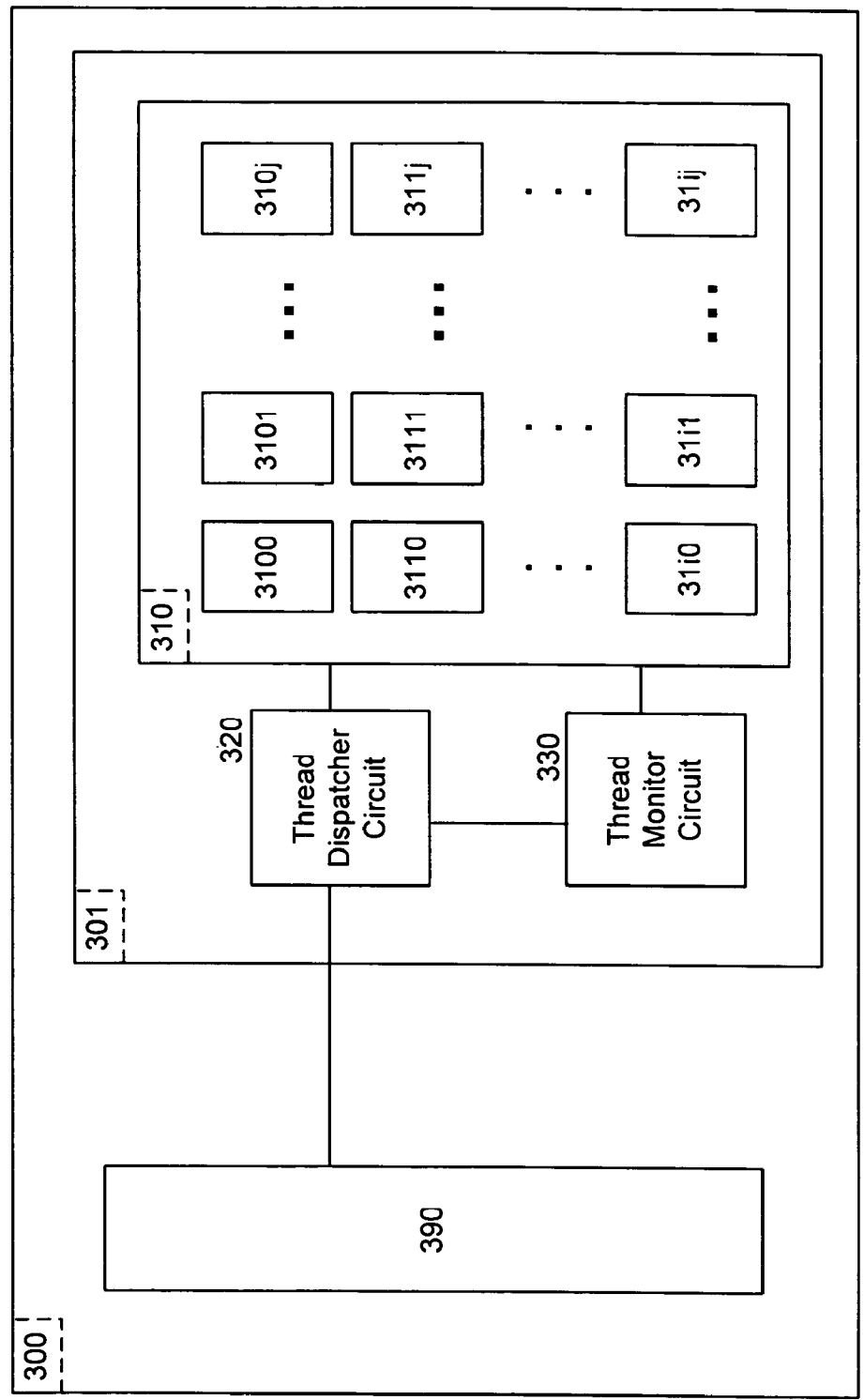

METHOD AND SYSTEM FOR REDUCING CONTEXT SWITCH TIMES

BACKGROUND

1. Field

The present disclosure relates to resource management of a multi-threaded system by controlling when thread state is stored to memory and, more specifically, to attempting to increase the speed in which task switching occurs by controlling whether or not thread state stored to memory.

2. Background Information

Many programming languages, operating systems, and other software development environments support what are called "threads" of execution. Threads are often similar to processes, in that both usually represent a single sequence of instructions executed in parallel with other sequences, either by time slicing or multiprocessing. Threads are often a way for a program to split itself into two or more simultaneously running tasks. For example, a common use of threads is having one thread paying attention to the graphical user interface, while others do a long calculation in the background. As a result, the application more readily responds to user's interaction.

Threads are usually distinguished from traditional multi-tasking processes in that processes are typically independent, carry considerable state information, and interact only through system-provided inter-process communication mechanisms. Multiple threads, on the other hand, typically share the state information of a single process, share memory and other resources directly. On operating systems that have special facilities for threads, it is typically faster for the system to context switch between different threads in the same process than to switch between different processes.

An advantage of a multi-threaded program may be that it can operate faster on computer systems that have multiple CPUs, or across a cluster of machines. This is because the threads of the program often naturally lend themselves for truly concurrent execution.

A context switch is the computing process of storing and restoring the state of a processor (the context) such that multiple processes can share a single processor resource. The context switch is an essential feature of a multitasking operating system. Context switches are usually computationally intensive and much of the design of operating systems is to optimize the use of context switches.

Context switches usually involve the following steps, assuming process P1 is running on the processor and process P2 is the next process to run on the processor:

First, the execution of P1 is halted.

Second, the context of P1 is stored somewhere in memory (usually on the stack of P1, or on the operating-system defined thread information structure). The context of the processor will typically contain the value of registers such as the program counter, processor control and general purpose registers.

Third, the context of P2 is retrieved from memory (usually on the stack of P2, or on the system structure associated with P2).

Finally, processing begins from the location contained in the program counter (the line of code at which P2 was interrupted).

Context switches are costly due to the fact that no actual process execution occurs while the state of the first process is stored and the state of the second process is loaded. If the processes contains a large number of threads (i.e. the processes are multi-threaded) the amount of state information needed to be saved and loaded may be large.

The amount of time needed to save the state information is generally limited by the amount of bandwidth available on the memory bus. For example, if the processor can only save X-bits per processor clock cycle via the memory bus and the state information needed to be saved is 10,000X-bits, the processor will not be able to execute any process instructions for at least 10,000 clock cycles, as the context switch between the two processes occurs. A need therefore exists to decrease the amount of time wasted during a context switch.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

FIG. 3 is a block diagram illustrating an embodiment of thread management apparatus and system in accordance with the claimed subject matter.

DETAILED DESCRIPTION

In the following detailed description, numerous details are set forth in order to provide a thorough understanding of the present claimed subject matter. However, it will be understood by those skilled in the art that the claimed subject matter may be practiced without these specific details. In other instances, well-known methods, procedures, components, and circuits have not been described in detail so as to not obscure the claimed subject matter.

Figure 1:
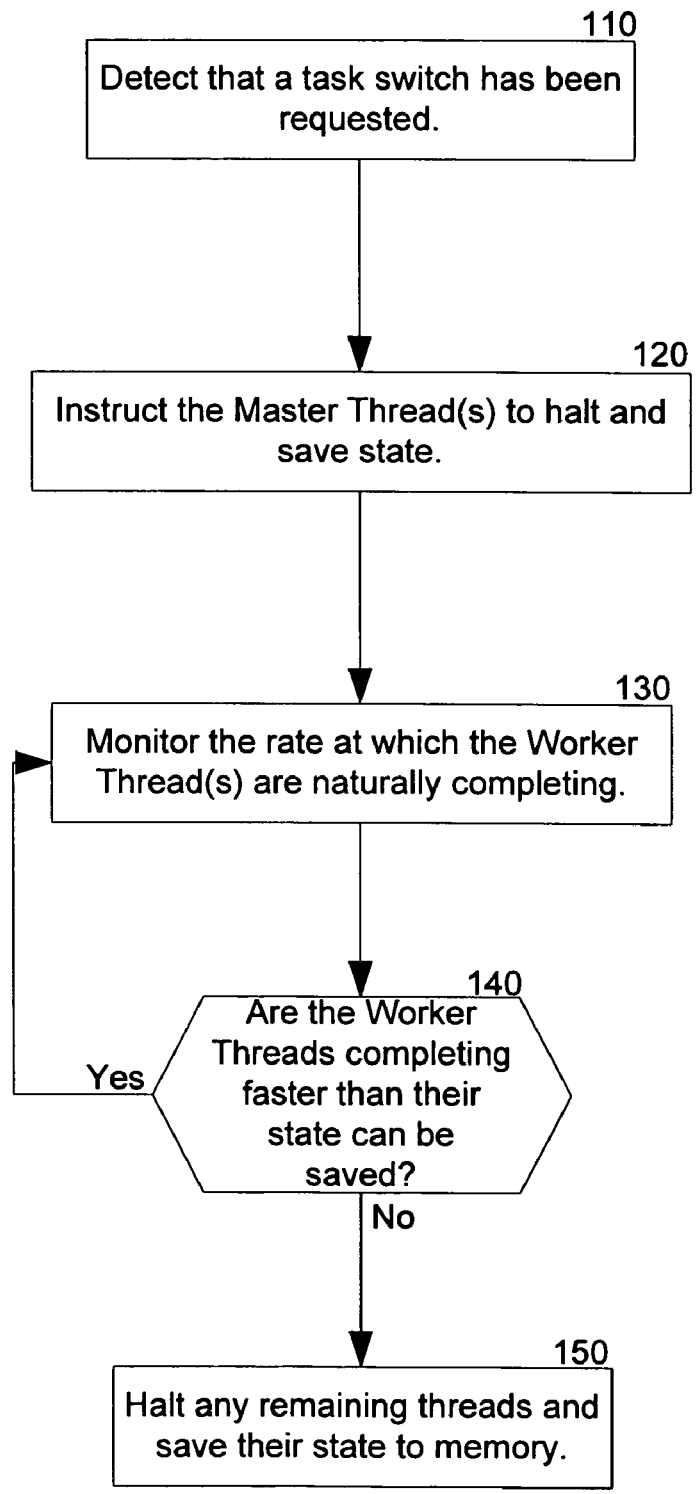
FIG. 1 is a flow chart illustrating an embodiment of thread management system in accordance with the claimed subject matter.

FIG. 1 is a flow chart illustrating an embodiment of thread management system in accordance with the claimed subject matter. Block 110 illustrates that a request to switch tasks may be detected. In one embodiment the request may be received by a software component, such as, for example, the operating system or device driver. In another embodiment, the request may be received by a hardware component, such as, for example, a thread dispatcher circuit or a thread monitor circuit.

Block 120 illustrates that the Master Thread or Threads may be instructed to halt processing and save the state of the threads. Master threads may be threads or hardware devices that create new Worker Threads. Worker Threads, conversely, may be threads that do not spawn new threads and typically process small units of work, such as, for example in an embodiment involving graphics processing a worker thread may involve shading a pixel.

In one embodiment, only the Master Threads may be halted; thereby preventing them from creating more Worker Threads. Any existing Worker Threads may be allowed to continue executing. Typically the state of the threads may be saved from the registers of the processor(s) to dynamic random access memory (DRAM), or another higher latency memory device.

Block 130 illustrates that as the Master Threads are saving their state, the rate at which Worker Threads are naturally completing may be monitored. In one embodiment, this monitoring may occur substantially simultaneously, or, in another embodiment, periodically, or in a time sharing fashion. In one embodiment, the thread monitoring may be accomplished utilizing a hardware mechanism primarily utilized for the purpose of thread scheduling.

Block 140 illustrates that a determination may be made as to whether or not the Worker Threads are completing at a faster rate that their state can be saved. In one embodiment the rate of thread retirement may be used to estimate the rate of state retirement, that is, the rate at which state information is finished being used and therefore no longer needs to be saved.

If the Worker Threads are completing at a rate faster than the rate at which their state could be saved, the Worker Threads may be allowed to continue processing, as illustrated by Block 130. In one embodiment, the rate at which a thread's state may be saved may be limited by the memory bandwidth.

If the Worker Threads are completing at a rate slower than the rate at which their state could be saved, the Worker Threads may be halted, as illustrated by Block 150. The state of the now halted Worker Threads may be saved utilizing a more conventional technique.

In one embodiment, short executing threads may be allowed to complete naturally. As the shorter executing threads naturally complete, the technique illustrated by FIG. 1 may dynamically adapt to the runtime characteristics of the current thread population. The longer executing threads may then be forcibly evicted. In an embodiment where the processor(s) supports variable size thread states the thread state retirement calculation may take that into account when making the determination of Block 140.

Figure 2:
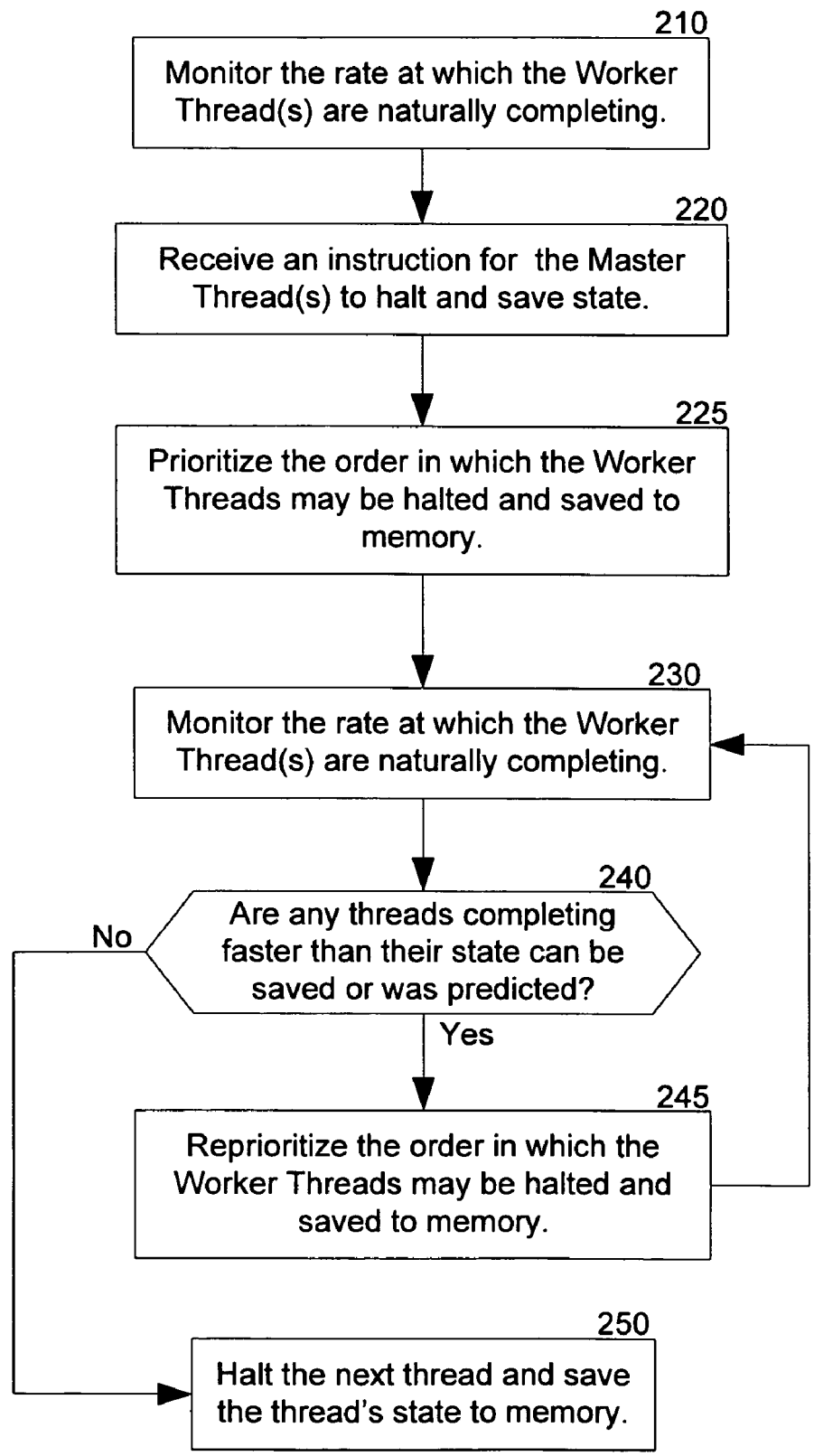
FIG. 2 is a flow chart illustrating another embodiment of thread management system in accordance with the claimed subject matter.

FIG. 2 is a flow chart illustrating another embodiment of thread management system in accordance with the claimed subject matter. The embodiment of FIG. 2 may be an adaptation of the previously described embodiment in which variable rates of completion or state information per thread may be allowed, and possibly estimated.

Block 210 illustrates that the rate at which Worker Threads complete may be monitored or otherwise estimated. In one embodiment the amount of state information associated with each Worker Thread may be monitored or otherwise estimated.

Block 220 illustrates that an instruction to halt and save the master Thread sates may be received. In one embodiment this may occur as described above in regards to Block 120 of FIG. 1.

Block 225 illustrates that, unlike the embodiment illustrated by FIG. 1 where all or no Worker Threads were halted, the order in which the Worker Threads of FIG. 2 may be halted and saved may be prioritized. In one embodiment, the Worker Threads retirement order may be prioritized by the rate of estimated completion. In another embodiment, the prioritization may be based upon the amount of state information needed to be saved. In yet another embodiment, another prioritization technique may be used. In one embodiment, the Worker Threads may be segregated into classes or groups. While in another embodiment, the Worker Threads may be individually prioritized.

In one embodiment, the Worker Threads with a low rate of state information and low rate of completion may be scheduled to be halted and saved first, while threads of an opposite nature may be scheduled to be halted and saved last. In another embodiment, involving multiple logical processors, the threads may be prioritized based upon which logical processor they are executing on.

Block 230 illustrates that the actual rate of Worker Thread completion may be monitored. Block 240 illustrates that a determination is made whether or not the threads are completing faster that their state can be saved or was predicted.

Block 245 illustrates that, in one embodiment, if the threads are completing faster than their state can be saved or was predicted, the thread retirement order may be reprioritized. In another embodiment, no reprioritization may occur or be attempted. Block 230 illustrates that the rate of completion may continue to be monitored.

Block 250 illustrates that, if the Worker Threads are completing at a rate slower than the rate at which their state could be saved, the Worker Threads may be halted. The state of the now halted Worker Threads may be saved utilizing a more conventional technique. In one embodiment, all Worker Threads may be saved or merely the next Worker Thread in the retirement order.

FIG. 3 is a block diagram illustrating an embodiment of thread management apparatus 301 and system 300 in accordance with the claimed subject matter. In one embodiment, apparatus 301 may include Thread Dispatcher Circuit 320, Thread Monitor Circuit 330 and Processor 310.

In one embodiment, Thread Dispatcher Circuit 320 may be capable of starting, halting, and/or saving the state of threads. In various embodiments, the Thread Dispatcher Circuit may be capable of performing the actions detailed, as described above, in regard to Blocks 110, 120, & 150 of FIG. 1, and Blocks 220, 225, & 250 of FIG. 2.

In one embodiment, Thread Monitor Circuit 330 may be capable of monitoring the rate at which threads are naturally completing or retiring. In various embodiments, the Thread Monitor Circuit may be capable of performing the actions detailed, as described above, in regard to Blocks 130 & 140 of FIG. 1, and Blocks 210, 225, 230, 240, & 245 of FIG. 2.

In one embodiment, processor 310 may be a single chip multiprocessor capable of executing a plurality of threads. FIG. 3 illustrates such an embodiment wherein processor 310 is comprised of an array of processors of size i by j, illustrated by processors 3100 through 31*ij*. It is understood that the number of processors need not be arranged in an array or any rectangular fashion. It is also understood that in one embodiment, the processor 310 may include a single core processor, a single physical core processor but with multiple logical cores, or a variety of multi-core processor configurations.

In one embodiment, the processor 310 may include a specialized purpose graphics processor. In one embodiment, the processor 310 may be a general purpose processor. In another embodiment, the processor may include a fixed function media processor where all threads are assumed to run for a fixed period of time. In one specific embodiment the register state of the processor may be 128 KB, 256 KB, or even higher.

In one embodiment, apparatus 301 may be integrated as a single integrated circuit or, conversely, as separate components. In one embodiment, system 300 may include apparatus 301 and a memory 390 which is capable of storing the state of the threads executing on the processor 310.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

The invention claimed is:

1. A method comprising:
   detecting a context switch request;
   in response to detecting the context switch request, performing the operations:
      halting a master thread from creating new worker threads,
      estimating a retirement rate of a state associated with a plurality of worker threads; and
      determining, based upon the estimated state retirement rate associated with the worker threads and a rate of saving state of the worker threads, if the worker threads should be halted and the state of the worker threads saved to a memory;
   wherein in response to the determining, halting and saving the state of the worker threads to the memory if the rate of saving is greater than the estimated state retirement rate, and wherein the rate of saving is determined based on a portion of a bandwidth available to write to the memory.

2. The method of claim 1 further comprising,
   if the rate of savings is not greater than the retirement rate, allowing the worker threads to naturally retire; and
   determining, based at least in part upon the state retirement rate of the worker threads, if the worker threads should be halted and the worker threads' state saved to memory.

3. The method of claim 1 wherein, estimating the retirement rate of the state associated with the worker threads comprises:
   monitoring the thread retirement rate of the worker threads; and
   estimating the state retirement rate based at least in part upon the thread retirement rate.

4. The method of claim 3, wherein estimating the state retirement rate based at least in part upon the thread retirement rate includes accounting for worker threads having variable size thread states.

5. The method of claim 3 wherein, monitoring the thread retirement rate of the worker threads comprises utilizing structures primarily capable of thread scheduling.

6. The method of claim 1, further comprising:
   based at least in part upon the estimation of state retirement rate, prioritizing the order in which worker threads will be halted and the worker threads' state saved.

7. The method of claim 6 further comprising:
   if the rate of savings is greater than the state retirement rate, halting and saving the state of the worker threads to a memory.

8. The method of claim 7 further comprising:
   if the rate of savings is not greater than the state retirement rate,
   allowing the worker threads to naturally retire, estimating the retirement rate of a state associated with worker threads,
   based at least in part upon the estimation of state retirement rate, prioritizing the order in which worker threads will be halted and the worker threads' state saved, and
   determining, based at least in part upon the state retirement rate of the worker threads, if the worker threads should be halted and the worker threads' state saved to memory.

9. An article comprising a machine storage medium having a plurality of machine accessible instructions, wherein when the instructions are executed, the instructions provide for:
   detecting a context switch request; and
   in response to detecting the context switch request, performing the steps of:
      halting a master thread from creating new worker threads,
      estimating a retirement rate of a state associated with a plurality of worker threads, and
      determining, based upon the estimated state retirement rate associated with the worker threads and a rate of saving state of the worker threads, if the worker threads should be halted and the state of the worker threads saved to a memory,
   wherein in response to the determining, halting and saving the state of the worker threads to the memory if the rate of saving is greater than the estimated state retirement rate, and wherein the rate of saving is determined based on a portion of a bandwidth available to write to the memory.

10. The article of claim 9 further comprising instructions providing for:
    if the rate of savings is not greater than the retirement rate, allowing the worker threads to naturally retire, and
    determining, based at least in part upon the state retirement rate of the worker threads, if the worker threads should be halted and the worker threads' state saved to memory.

11. The article of claim 9 wherein, the instructions providing for estimating the retirement rate of a state associated with worker threads comprise instructions providing for:
    monitoring the thread retirement rate of the worker threads; and
    estimating the state retirement rate based at least in part upon the thread retirement rate.

12. The article of claim 11, wherein the instructions providing for estimating the state retirement rate based at least in part upon the thread retirement rate includes instructions providing for accounting for worker threads having variable size thread states.

13. The article of claim 11 wherein, the instructions providing for monitoring the thread retirement rate of the worker threads comprises instructions providing for utilizing structures primarily capable of thread scheduling.

14. The article of claim 9, further comprising instructions providing for:

based at least in part upon the estimation of state retirement rate, prioritizing the order in which worker threads will be halted and the worker threads' state saved.

15. The article of claim 14 further comprising instructions providing for:
if the rate of savings is greater than the state retirement rate, halting and saving the state of the worker threads to a memory.

16. The article of claim 15 further comprising instructions providing for:
if the rate of savings is not greater than the state retirement rate,
allowing the worker threads to naturally retire,
based at least in part upon the estimation of state retirement rate, prioritizing the order in which worker threads will be halted and the worker threads' state saved and
determining, based at least in part upon the state retirement rate of the worker threads, if the worker threads should be halted and the worker threads' state saved to memory.

17. An apparatus comprising:
a processor executing a plurality of worker threads having state information;
a thread monitoring circuit perform:
estimating a retirement rate of a state associated with the worker threads; and
a thread dispatcher circuit perform:
detecting a context switch request,
in response to detecting the context switch request, perform:
determining, based upon the estimated state retirement rate associated with the worker threads and a rate of saving state of the worker threads, if the worker threads should be halted and the state of the worker threads saved to a memory, and
in response to the determining, halting and saving the state of the worker threads to the memory if the rate of saving is greater than the estimated state retirement rate, and wherein the rate of saving is determined based on a portion of a bandwidth available to write to the memory.

18. The apparatus of claim 17 wherein the thread dispatcher circuit that is further capable of:
if the rate of savings is not greater than the retirement rate, allowing the worker threads to naturally retire, and
determining, based at least in part upon the state retirement rate of the worker threads, if the worker threads should be halted and the worker threads' state saved to memory.

19. The apparatus of claim 17 wherein, the thread monitoring circuit is further capable of:
monitoring the thread retirement rate of the threads; and
estimating the state retirement rate based at least in part upon the thread retirement rate.

20. The apparatus of claim 19, wherein the thread monitoring circuit is further capable of:
estimating the state retirement rate based at least in part upon the worker thread retirement rate by accounting for worker threads having variable size thread states.

21. The apparatus of claim 19 wherein, the thread monitoring circuit is further capable of thread scheduling.

22. The apparatus of claim 17, wherein the thread dispatcher circuit is further capable of:
based at least in part upon the estimation of state retirement rate, prioritizing the order in which worker threads will be halted and the worker threads' state saved.

23. The apparatus of claim 17 wherein the processor includes a single chip multiprocessor.

24. The apparatus of claim 23 wherein the processor includes a register state of at least 128 kilobytes.

25. A system comprising:
a processor executing a plurality of worker threads having state information;
a memory storing the state information of the worker threads when the threads are not being executed by the processor
a thread monitoring circuit perform:
estimating a retirement rate of a state associated with the worker threads; and
a thread dispatcher circuit perform:
detecting a context switch request,
in response to detecting the context switch request, determining, based upon the estimated state retirement rate associated with the worker threads and a rate of saving state of the worker threads, if the worker threads should be halted and the state of the worker threads saved to a memory, and
in response to the determining, halting and saving the state of the worker threads to the memory if the rate of saving is greater than the estimated state retirement rate, and wherein the rate of saving is determined based on a portion of a bandwidth available to write to the memory.

26. The system of claim 25 wherein the thread dispatcher circuit that is further capable of:
if the rate of savings is not greater than the retirement rate, allowing the threads to naturally retire, and
determining, based at least in part upon the state retirement rate of the worker threads, if the worker threads should be halted and the worker threads' state saved to memory.

27. The system of claim 25, wherein the thread monitoring circuit is further capable of:
monitoring the thread retirement rate of the threads; and
estimating the state retirement rate based at least in part upon the thread retirement rate.

28. The system of claim 27, wherein the thread monitoring circuit is further capable of:
estimating the state retirement rate based at least in part upon the thread retirement rate by accounting for worker threads having variable size thread states.

29. The system of claim 27 wherein, the thread monitoring circuit is further capable of thread scheduling.

30. The system of claim 25, wherein the thread dispatcher circuit is further capable of:
based at least in part upon the estimation of state retirement rate, prioritizing the order in which worker threads will be halted and the worker threads' state saved.

31. The system of claim 25 wherein the processor includes a single chip multiprocessor.

32. The system of claim 31 wherein the processor includes a register state of at least 128 kilobytes.

* * * * *